United States Patent
Aldcroft et al.

[11] Patent Number: 5,944,081
[45] Date of Patent: *Aug. 31, 1999

[54] ENLARGED IRON COVER WITH ROUGH TEXTURED INNER SURFACE

[75] Inventors: Gary Aldcroft; David Hoyt, both of Gardena, Calif.

[73] Assignee: Virco Mfg. Corporation, Torrance, Calif.

[*] Notice: This patent is subject to a terminal disclaimer.

[21] Appl. No.: 08/916,838

[22] Filed: Aug. 25, 1997

Related U.S. Application Data

[63] Continuation-in-part of application No. 08/530,065, Sep. 19, 1995, Pat. No. 5,735,327, which is a continuation-in-part of application No. 08/434,517, May 4, 1995, Pat. No. 5,611,379.

[51] Int. Cl.$^6$ ............................ A63B 57/00; B65D 65/08
[52] U.S. Cl. ........................................ 150/160; 206/315.4
[58] Field of Search .................... 150/160, 159; 206/315.4

[56] References Cited

U.S. PATENT DOCUMENTS

| | | | |
|---|---|---|---|
| 1,957,577 | 5/1934 | Chapman | 150/160 |
| 2,035,529 | 3/1936 | Bucklin | 150/160 |
| 2,526,985 | 10/1950 | Whitehead | 150/160 |
| 2,705,039 | 3/1955 | Halter | 150/160 |
| 3,593,769 | 7/1971 | Spears | 150/160 |
| 4,213,614 | 7/1980 | Phillippi | 150/160 X |
| 5,117,884 | 6/1992 | Diener et al. | 150/160 |
| 5,345,987 | 9/1994 | Hagar | 150/160 |
| 5,413,213 | 5/1995 | Diener et al. | 150/160 |
| 5,547,193 | 8/1996 | Sander | 150/160 X |
| 5,575,720 | 11/1996 | Daniel | 150/160 X |
| 5,611,379 | 3/1997 | Hoyt et al. | 150/160 |
| 5,735,327 | 4/1998 | Aldcroft et al. | 150/160 |

*Primary Examiner*—Sue A. Weaver
*Attorney, Agent, or Firm*—James E. Brunton

[57] ABSTRACT

A head cover for an iron golf club has an enlarged cover section which fits over the head of irons of different sizes. The cover section includes an internal cavity with an enlarged open mouth through which the head passes upon placing the cover section over the head and a protector section which covers, at least partially, the hosel member of the shaft when the head is received within the cavity. A clip near the open mouth expands with the shaft of the iron golf club being pushed into the cavity and retracts to hold the shaft when the head is received within the cavity. In one form of the invention, the clip is uniquely molded into the protector section of the head cover. In another form, the clip includes leg portions which can be lockably inter-connected to secure the head cover in position over the golf club.

11 Claims, 5 Drawing Sheets

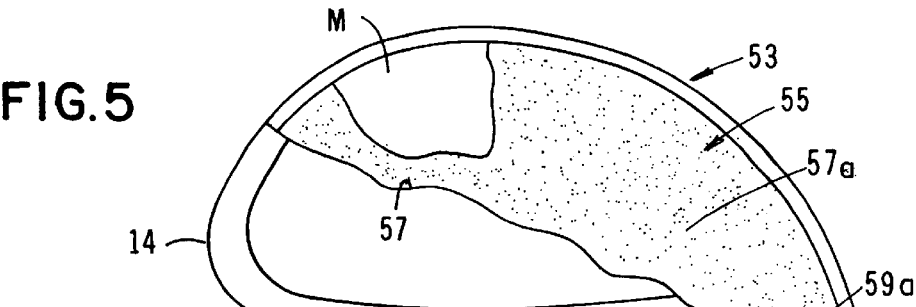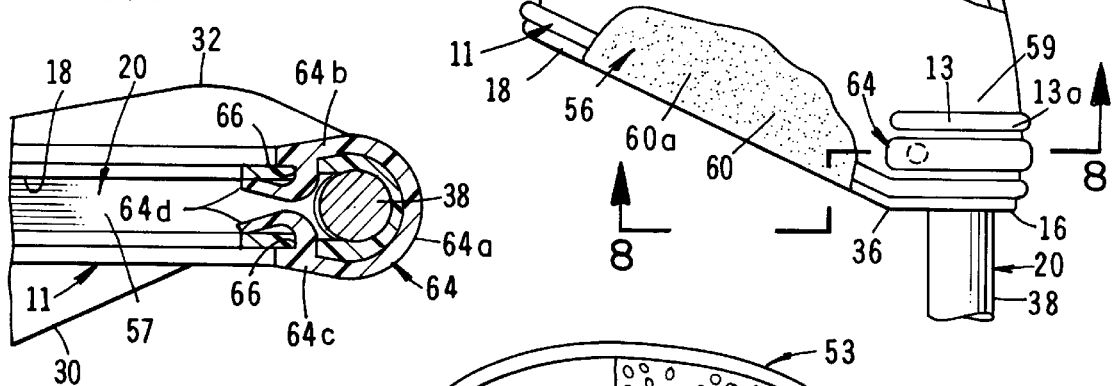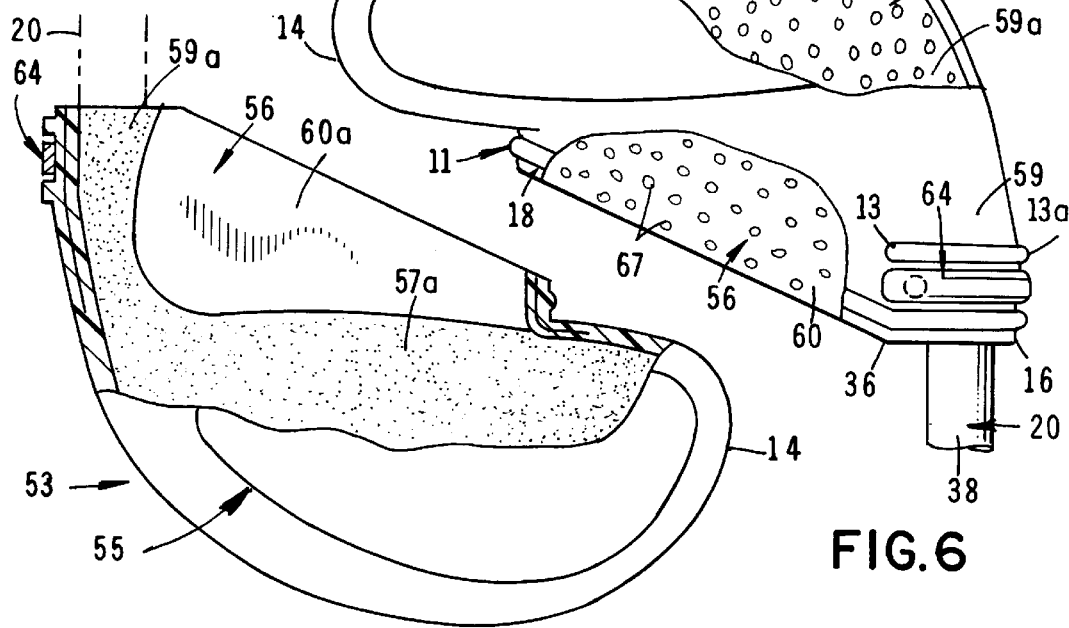

5,944,081

ENLARGED IRON COVER WITH ROUGH TEXTURED INNER SURFACE

BACKGROUND OF THE INVENTION

This is a Continuation-In-Part Application of application Ser. No. 08/530,065, filed Sep. 19, 1995, now U.S. Pat. No. 5,735,327, which is a Continuation-In-Part application of Ser. No. 08/434,517, filed May 4, 1995, now U.S. Pat. No. 5,611,379.

FIELD OF THE INVENTION

This invention relates to a cover for the head of an iron golf club.

BACKGROUND OF THE INVENTION

Covers for irons are popular, but they usually only protect the face of the iron. It is desirable to extend the cover along the shaft of the iron so that it covers the hosel member of the shaft. U.S. Pat. No. 5,117,884 illustrates an iron cover which is designed to cover the hosel member of the shaft in addition to the head of the iron. It is also desirable to have the cover fit all sizes of irons, that is, from the One Iron through the Wedge. This requires the use of an enlarged open mouth through which the head of the iron passes when the cover is placed on the iron. As a consequence of protecting the hosel member and using an enlarged open mouth, it is difficult to retain the cover in position on the head of the iron, so that it does not accidentally fall off during use.

SUMMARY OF THE INVENTION

It is an objective of this invention to provide a cover for an iron golf club which fits all the different sized irons, protects the hosel member of the shaft of the iron, and is retained in position until manually removed by the golfer.

The iron cover of this invention has several features, no single one of which is solely responsible for its desirable attributes. Without limiting the scope of this invention as expressed by the claims which follow, its more prominent features will now be discussed briefly. After considering this discussion and particularly after reading the section entitled, "DETAILED DESCRIPTION OF THE PREFERRED EMBODIMENT", one will understand how the features of this invention provide its benefits, which include protection of the hosel member, and fitting all sized irons.

The first feature of the head cover of this invention is that it includes an enlarged cover section which fits over the head of irons of different sizes. The cover section has an internal cavity with an enlarged open mouth through which the head of the iron passes upon placing the cover section of the head and a protector section which covers, at least partially and preferably substantially all, the hosel member when the head is received within the cavity.

The second feature is a clip member near the open mouth and the protector section which expands with the shaft of the iron golf club being pushed into the cavity and retracts to hold the shaft when the head is received within the cavity. The clip member is preferably on the exterior of the protector section adjacent the open mouth. There is a retainer member which holds the clip member in position. The clip member includes a base having opposed ends and a pair of legs. Each leg extends outward in the same direction for an end of the base, so that it has a generally U-shaped configuration.

The third feature of one embodiment of the invention, is that the protector section has a pair of opposed openings near the open mouth and the clip member has a pair of pin elements. Each pin element extends through one of the openings, and the shaft engages the pin elements to expand the clip member when the shaft is pushed into the cavity. In an alternate embodiment, the clip member is integrally molded within the protector section.

Still another highly important objective of the invention is to provide a cover for an iron golf club of the character described in the preceding paragraphs in which all or a substantial portion of the interior surface of the cover exhibits a rough texture which facilitates entry of the head of the iron golf club into the cover.

DESCRIPTION OF THE DRAWINGS

The preferred embodiment of this invention, illustrating all its features, will now be discussed in detail. This embodiment depicts the novel and non-obvious iron cover of this invention as shown in the accompanying drawing, which is for illustrative purposes only. This drawing includes the following figures (Figures), with like numerals indicating like parts:

FIG. 5 is a side-elevational view of an alternate embodiment of the iron cover of this invention partly broken away to show internal construction.

FIG. 6 is a side-elevational view of still another form of the iron cover of the invention partly broken away to shown internal construction.

FIG. 7 is a side-elevational view of yet another embodiment of the invention partly broken away to show internal construction.

FIG. 8 is a fragmentary, cross-sectional view taken along lines 8—8 of FIG. 5 showing an alternate form of retaining clip.

DETAILED DESCRIPTION OF THE PREFERRED EMBODIMENT

Figure 1:
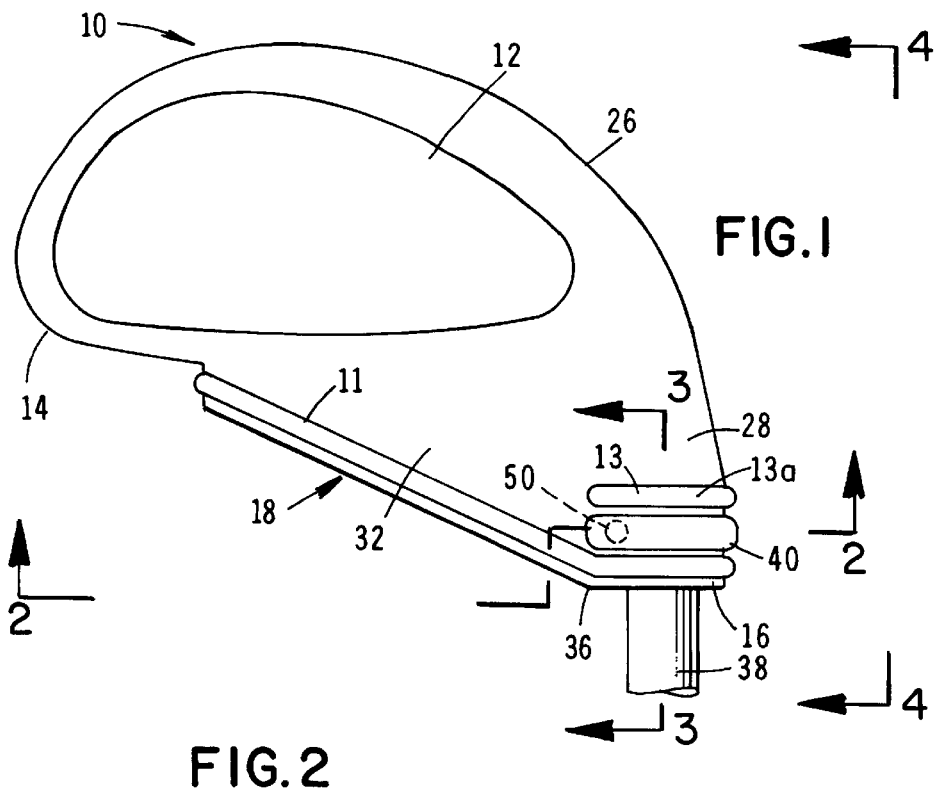
FIG. 1 is a side-elevational view of the iron cover of this invention.
Figure 2:
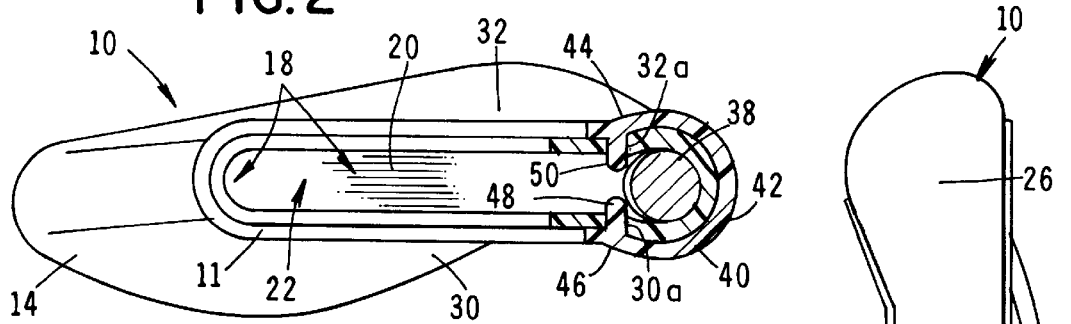
FIG. 2 is a cross-sectional view taken along line 2—2 of FIG. 1.
Figure 3:
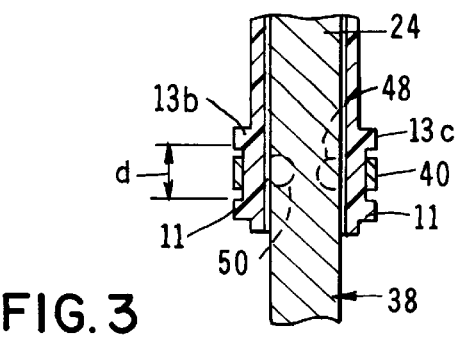
FIG. 3 is a cross-sectional view taken along line 3—3 of FIG. 1.
Figure 4:
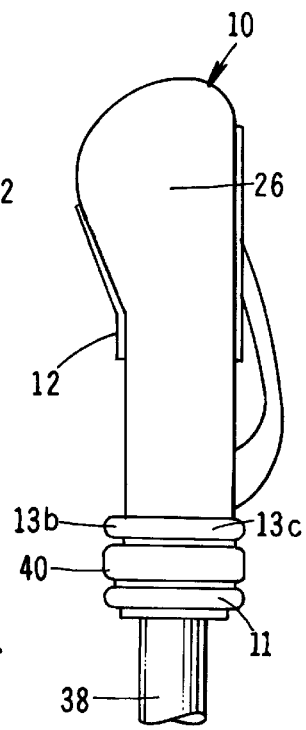
FIG. 4 is a view taken along line 4—4 of FIG. 1.

As depicted in FIGS. 1 through 3, the iron cover 10 of this invention includes an enlarged cover section 12 which has a forward end 14, a rear end 16, a back side 26 extending between the forward and rear ends, opposed side walls 30 and 32 connected to the back side, and an enlarged, elongated open mouth 18 extending between the forward and rear ends. An iron 20 (only partially shown) is received within an enlarged cavity 22 within the cover section 12. Thus, the head of the iron 20 is completely covered when the iron cover 10 is placed on the head of the iron. There is a collar 11 along the perimeter of the open mouth that circumscribes the open mouth, and a U-shaped flange 13 that is spaced from the collar a short distance d. The U-shaped flange 13 has a base 13a which extends over the back side 26, and a pair of opposed legs 13b and 13c which, respectively, extend over the side walls 30 and 32. In each side wall 30 and 32 is an opening 30a and 32a, respectively. These openings 30a and 32a are directly opposed to each other.

In accordance with one feature of this invention, the cover section 12, and the cavity 22 within this section, are large enough to accept irons of different sizes, so that one size cover 10 fits all sizes of irons. The open mouth 18 is sufficiently large so that the irons easily pass through the open mouth 18 into the cavity 22. Typically, the open mouth 18 is longer than it is wide, and has a length of from about 2 to about 4 inches. The cover section 12 is preferably made using conventional slush molding techniques from a polymeric material such as, for example, polyvinyl chloride. This gives the cover section 12 flexibility.

In accordance with another feature of this invention, the hosel member 24 of the iron 20 is covered. In the preferred embodiment depicted, the entire hosel member 24 is covered, although in some embodiments of this invention it may only be partially covered. To provide this feature, the cover section 12 includes a hosel protector section 28. The hosel protector section 28 comprises the back side 26 of the cover section 12 adjacent the rear end 16, and the lower portions of the side walls 30 and 32 of the cover section 12. The rear end 16 is lower than the forward end 14 as viewed in FIG. 1, and the open mouth 18 extends along a straight, but slanting, line between the forward end 14 and an intermediate point 36 that is below the lower end of the hosel member 24 when the head of the iron 20 is lodged within the cavity 22 of the cover 10. The open mouth 18 then extends along a straight line between the intermediate point 36 and the rear end 16. The distance between the intermediate point 36 and the rear end 16 is relatively short compared to the total length of the open mouth, and is only about twice the diameter of the shaft 38 of the iron 20. Typically, this distance between the intermediate point 36 and the rear end 16 is from about 0.50 to about 1 inch.

In order to prevent the cover 10 from slipping off the head of the iron 20, a clip 40 is employed to hold the cover to the iron. This clip 40 has a base 42 having opposed ends with a leg 44 and 46, respectively, at each end. Each leg 44 and 46 extends outward in the same direction from the ends of the base 42. thus, the clip 40 has a generally U-shaped configuration. There are a pair of pins 48 and 50 at each end of the legs 44 and 46 that point inward towards each other. The clip 40 fits over the exterior of the cover section 12 near the rear end 16, and it is held in position by a portion of the collar 11 between the intermediate point 36 and the rear end 16 and the U-shaped flange 13. The width of the clip 40 is slightly less than the distanced. Thus, the portion of the collar 11 between the intermediate point 36 and the rear end 16 and the U-shaped flange 13 serve as a retainer that prevents the clip 40 from moving up and down along the back side 26 of the cover section 12. The clip 40 is on the exterior of the cover 10, and the pins 48 and 50 slip into openings 30a and 32a when they are aligned with these openings. The clip 40 is spring biased, so that when the head of the iron 20 is inserted into the open mouth 18, the shaft 38, or the hosel member 24 which is part of the shaft, engages the pins 48 and 50 to expand the clip 40, pushing the legs 44 and 46 apart. As soon as the shaft 38 passes the pins 48 and 50, the clip 40 returns to its normal condition shown in FIG. 2. Thus, the cover 10 is held by the clip 40 to the shaft 38.

Referring now to FIGS. 5 through 7, several alternate forms of the invention are there shown. These forms of the invention are similar in most respects to that shown in FIGS. 1 through 4 and like numerals are used in FIGS. 5 through 7 to identify like components. The principal difference between the head cover shown in FIGS. 1 through 4 and those shown in FIGS. 5 through 7 resides in the design of the retainer clip and the character of the interior surface of the cover. In this regard, experience by applicant has shown that if all or part of the interior surface of the cover is provided with a rough texture, insertion of the golf club head into the cover is greatly facilitated. As used herein the term "rough texture" means a surface texture having a multiplicity of upstanding protuberances which will engage the surface of the golf club head in a manner to facilitate entry to the head into the cover.

Turning first to FIGS. 5 and 8, the cover 53 of this first alternate form of the invention comprises an enlarged cover section 55 and a skirt section 56. Skirt section 56 has an elongated open mouth 18 extending between the forward and rear ends of the cover. In the manner previously described, an iron 20 (only partially shown) is received within an enlarged cavity 57 formed within the cover section 55.

An important feature of this latest form of the invention resides in the fact that the interior or internal surface 57a of cover section 55 is formed with a rough texture which materially facilitates entry of the golf club head into cavity 57 which is defined by internal surface 57a.

As in the earlier described embodiment, there is a collar 11 along the perimeter of the skirt section that circumscribes the open mouth 18, and a U-shaped flange 13 that is spaced from the collar a short distance. the U-shaped flange 13 has a base 13a which extends over the back side of the cover, and a pair of opposed legs extend over the side walls.

In this latest form of the invention, the hosel member of the iron 20 is also covered. To provide this covering, the skirt section 84 includes a hosel protector section 90 which includes a portion of the back side 92 of the cover section 82 adjacent the rear end 94. The combination of the hosel protector section and the skirt section 84 is herein referred to as the protector section of the cover which is generally designated in the drawings by the numeral 96. As before, the rear end of the protector section is lower than the forward end, and the open mouth 86 extends along a straight, but slanting, line between the forward end and an intermediate point that is below the lower end of the hosel member when the head of the iron 20 is lodged within the cavity of the cover. The open mouth 86 then extends along a straight line between the intermediate point and the rear end of the cover.

In order to prevent the cover from slipping off the head of the iron 20, a clip 64 is employed to hold the cover to the iron. This clip 64 is of a slightly different construction from that previously described and includes a base 64a and a pair of legs 64b and 64c. Each leg extends outward in the same direction from the ends of the base 64a to form a clip which has a generally U-shaped configuration. Provided proximate the inboard end of each leg is an internal locking extremity 64d. Locking extremities extend through apertures 66 formed in the side walls of the protector section and firmly grip the inner wall surface of the cover in the manner shown in FIG. 8. With this construction, extremities 64d hold the clip in place and prevent it from moving up and down along the back side of the cover.

Hosel protector section 59 includes an interior or internal surface 59a, which like the interior surface 57a of the cover section 55 and the interior surface 60a of the protector section 60, is provided with a rough texture which further facilitates entry of the golf club head into the device. The exterior surface of the protector section 60 is, on the other hand, provided with a smooth substantially texture-free surface.

While the rough texture on the internal surfaces of the cover section 55 and the protector section 60 can be provided in several ways, a novel slush coating technique is preferred. This technique, which comprises the method of one form of the present invention, involves the use of a heated mold, the cavity of which generally corresponds to the exterior shape of the cover. The mold "M" (FIG. 6) is of conventional construction having an access port into which a mixture of plasticizer and polyvinyl chloride resin can be poured. Prior to pouring the mixture, sometimes referred to in the trade as a plastisol, the mold is heated to a temperature of between about 80 degrees and 220 degrees Fahrenheit. In one form of the invention, the mixture of plasticizer and polyvinyl chloride resin is poured into the access port of the mold to substantially fill the cavity volume. As the plastisol engages the heated interior surface of the mold, a gelatinous first skin will be formed. After this skin is formed, the remainder of the first mixture over and above that required to form the first skin is poured from the access port of the mold. Following this step, a second mixture of plasticizer, polyvinyl chloride resin and particle blending resin is poured into the access port to at least partially fill the internal volume defined by the first skin. This second mixture engages the heated first skin and, in so doing, forms a second skin.

In the preferred form of the invention, a slip agent also forms a part of the section mixture. A suitable slip agent for this purpose is sold under the name and style "SLIPQUICK" by The Synpro Company of Texas. Other readily commercially available, slip agents can also be used in the practice of the preferred form of the invention.

After the remaining portion of the second mixture is poured from the access port of the mold, the mold along with the first and second skins formed therewithin are heated in a temperature-controlled oven at an elevated temperature sufficient to cause the first and second skins to cure and to integrate into a cover-defining wall having an interior, rough-textured surface and an exterior surface substantially corresponding to the shape of the mold cavity. After the first and second skins have been appropriately cured, the cover thus formed is removed from the mold.

The degree of roughness of the interior surface of the cover varies depending upon the nature of the particle-blending resin used to form the second mixture. If the particle-blending resin contains relative small particles, the degree of roughness of the interior surface of the cover will be less coarse than if large particles are used in the formation of the particle blending resin.

Turning once again to the drawings, and particularly to FIG. 5, it will be noted that both the interior surface 57a of the cover section 55 and the interior surface 60a of the protector section are provided with a texture consistent with the use of a particle blending resin having relatively small particles. On the other hand, by referring to FIG. 6, it can be seen that in an instance wherein the particle-blending resin contains relatively large particles, the inner surfaces 57a and 60a exhibit a multiplicity of larger upstanding protuberances 67 on the inner surface of the cover thereby making the texture thereof quite rough.

Turning next to FIG. 7, yet another form of the invention is there shown. This form of the invention is identical in most respects to that shown in FIGS. 5 and 6 save that the interior surface of the cover includes a rough textured portion which is not co-extensive with the entire peripheral extent of the inner surface of the cover. Rather, as illustrated in FIG. 7, while the interior surface 57a of the cover section 55 is substantially of a rough texture, the majority of the surface 60a of the protector section 60 is generally smooth.

In producing the cover shown in FIG. 7, the method of the invention is similar in many respects to the method described in connection with the production of the covers illustrated in FIGS. 5 and 6. More particularly, after the mold "M" has been heated to an elevated temperature of between 80 and 220 degrees Fahrenheit, a first mixture of plasticizer and polyvinyl chloride resin is poured into the access port to substantially fill the cavity volume to form a gelatinous first skin. The remaining portion of the first mixture is then poured from the mold leaving the first gelatinous skin within the mold cavity. This first skin is once again substantially co-extensive with the mold cavity and has a surface generally corresponding to the external surface of the cover.

The next step in the latest form of the method of the invention is to pour a second mixture of plasticizer, polyvinyl chloride resin and particulate blending resin into the access port. However, in this instance, the internal volume defined by the first skin is only partially filled with the first mixture. More particularly, this volume is filled only to an extent to substantially cover section 55 which is that portion of the head cover that surrounds the face and back of the golf club iron.

After the second skin is formed, the remainder of the second mixture is carefully poured from the mold in a manner such that the second mixture engages only the spline portion 69 of the second skin as it is poured from the mold, but does not come in contact with a substantial portion of the side walls of protector section 60. By pouring the remainder of the second mixture from the mold in this manner, the uniquely textured surface illustrated in FIG. 7 is produced. As illustrated in FIG. 7, in this last form of the invention, the interior surface of the cover section exhibits a rough texture as does surface 59a while the majority of the protector section 60 exhibits a relatively smooth internal surface identified in FIG. 7 as 60a. As before, the degree of coarseness of the internal surface depends primarily upon the size of the particles used to produce the particle-blending resin that comprises a part of the second mixture.

Figure 9:
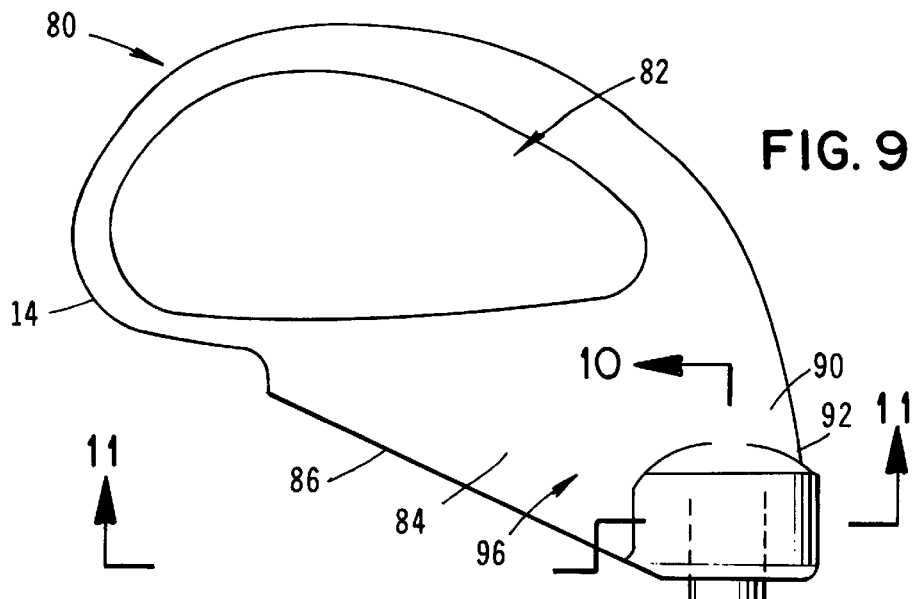
FIG. 9 is a side-elevational view of an alternate form of the iron cover of this invention.
Figure 10:
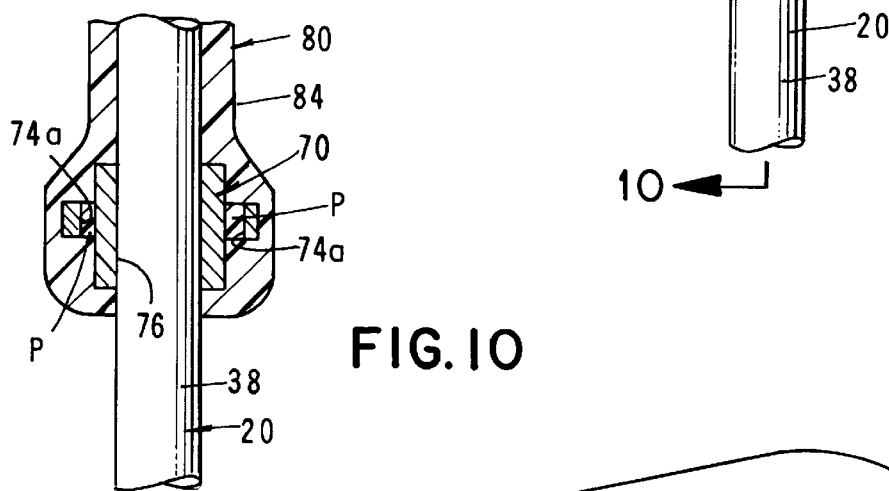
FIG. 10 is a cross-sectional view taken along lines 10—10 of FIG. 9.
Figure 11:
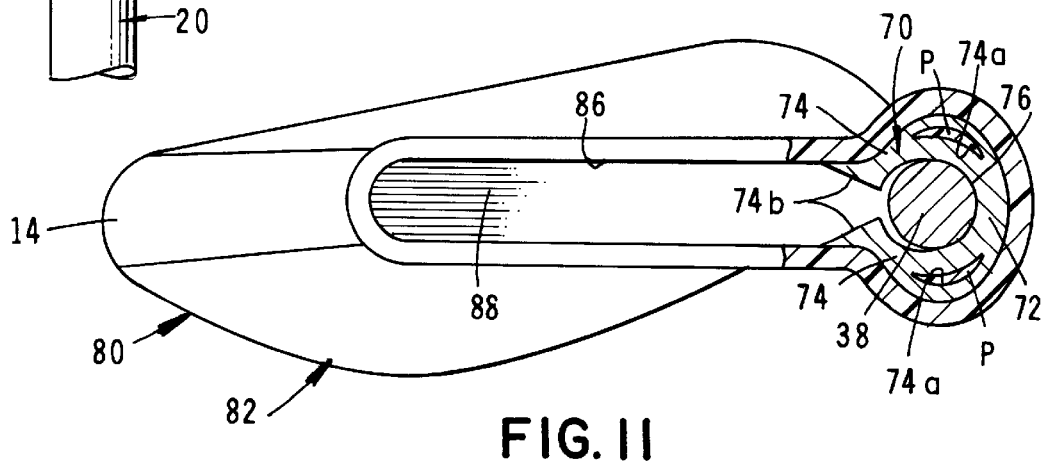
FIG. 11 is a cross-sectional view taken along lines 11—11 of FIG. 9.

Referring next to FIGS. 9 through 11, still another alternate form of the invention is there shown. This form of the invention is similar in some respects to the earlier described embodiments of the invention and like numerals are used in FIGS. 9 through 11 to identify like components. The principal difference between the head cover shown in FIGS. 1 through 8 and that shown in FIGS. 9 through 11 resides in the design of the retainer clip means of the device. In this regard, as best seen in FIG. 11, this means here comprises a generally U-shaped clip 70 having a bight portion 72 and a pair of oppositely disposed, yieldably deformable leg portions 74 which cooperate to define a shaft receiving opening 76. Uniquely, each leg portion 74 is provided with a longitudinally extending opening 74a which extends generally parallel to the golf club shaft when the cover is positioned over the head of the club. In a manner presently to be described, openings 74a are filled with the moldable plastic "P" used to form the cover.

As before, the cover 80 of this latest form of the invention comprises an enlarged cover section 82 and a skirt section 84. Skirt section 84 has an elongated open mouth 86 extending between the forward and rear ends of the cover. In the manner previously described, an iron 20 (only partially shown) is received within an enlarged cavity 88 formed within the cover section 82.

In this latest form of the invention, the hosel member of the iron 20 is also covered. To provide this covering, the skirt section 84 includes a hosel protector section 90 which includes a portion of the back side 92 of the cover section 82. The combination of the hosel protector section and the skirt section 84 is herein referred to as the protector section of the cover which is generally designated in the drawings by the numeral 96. As before, the rear end of the protector section is lower than the forward end, and the open mouth 86 extends along a straight, but slanting line between the forward end and an intermediate point that is below the lower end of the hosel member when the head of the iron 20 is lodged within the cavity of the cover. The open mouth 86 then extends along a straight line between the intermediate point and the rear end of the cover.

The previously mentioned means defining the retainer clip 70 functions to prevent the cover from slipping off the head of the iron 20 when the cover is in place over the iron head. Clip 70 is of a slightly different construction from that previously described and is integrally molded within the moldable plastic resin "R" from which the head cover is formed in accordance with the method of the invention. Provided proximate the inboard end of each leg portion 74 is an inwardly extending protuberance 74b which partially circumscribes the shaft 38 in the manner best seen in FIG. 11. During molding, the moldable plastic resin extends into openings 74a so as to hold the clip securely in place within protector section 90.

The method of this latest form of the invention involves the use of a heated mold, the cavity of which generally corresponds to the exterior shape of the cover. The mold is of the character shown in FIG. 2 and is of conventional construction having an access port into which a mixture of plasticizer and polyvinyl chloride resin can be poured. Prior to pouring the mixture, sometimes referred to in the trade as a plastisol, the clip means, or clip 70, is positioned within the mold in the desired location and the mold is heated to a temperature of between about 80 degrees and 220 degrees Fahrenheit. A mixture of plasticizer and polyvinyl chloride resin is then poured into the access port of the mold to substantially fill the cavity volume and also to fill openings 74a provided in the legs 74 of the clip. As the plastisol engages the heated interior surface of the mold and enters opening 74a, it will form the walls of the cover and will securely position clip 70 within the protector section in the manner shown in FIGS. 10 and 11.

As previously discussed, in the preferred form of the invention, a slip agent also forms a part of the moldable plastic mixture. A suitable slip agent for this purpose is sold under the name and style, "SLIPQUICK" by The Synpro Company of Texas. Other readily commercially available slip agents can also be used in the practice of the preferred form of the invention.

Following the filling step, the mold along with the clip 70 are heated in a temperature controlled oven at an elevated temperature sufficient to cause the moldable plastic mixture "R" to cure with the clip 70 securely embedded within the plastic. After the mixture has been appropriately cooled, the cover and integrated clip thus formed are removed from the mold.

Figure 12:
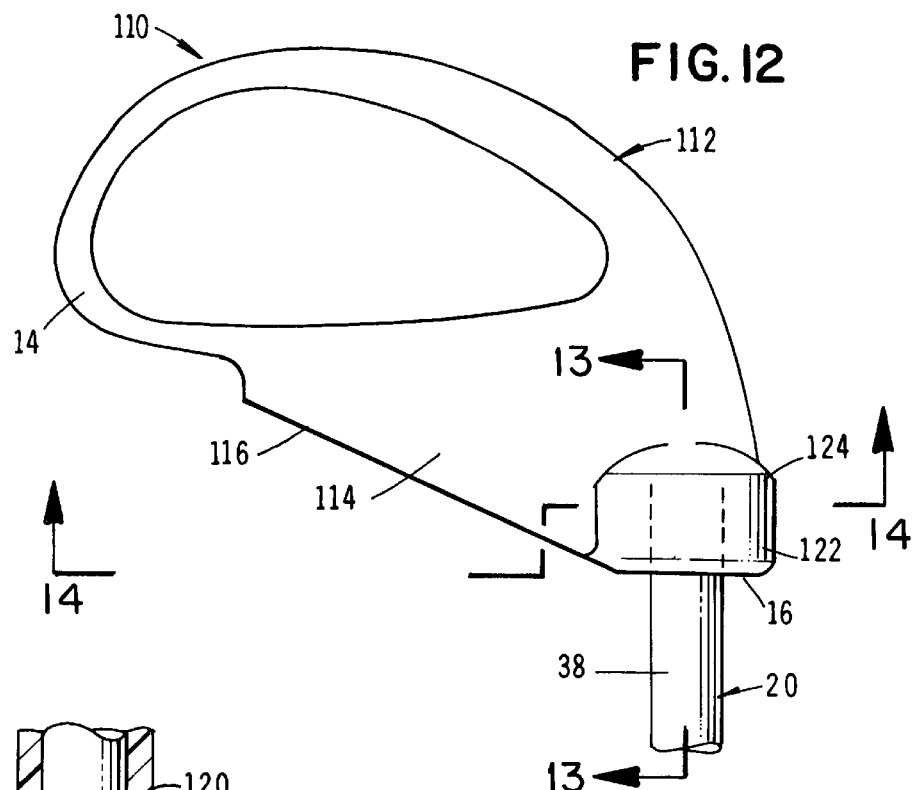
FIG. 12 is a side-elevational view of still another embodiment of the iron cover of the invention.
Figure 13:
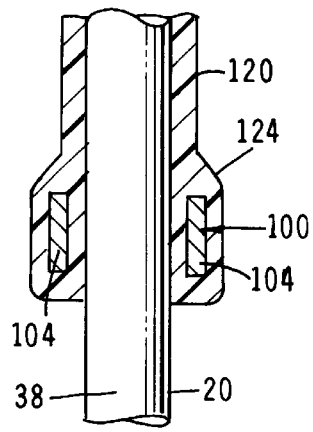
FIG. 13 is a cross-sectional view taken along lines 13—13 of FIG. 12.
Figure 14:
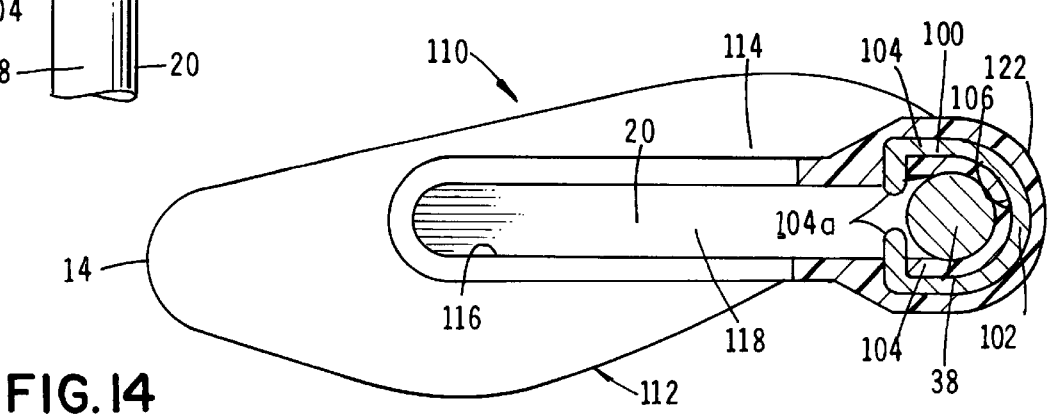
FIG. 14 is a cross-sectional view taken along lines 14—14 of FIG. 12.

Turning next to FIGS. 12 through 14, yet another embodiment of the invention is there shown. This embodiment is also similar in some respects to the earlier described embodiment of the invention and like numerals are used in FIGS. 12 through 14 to identify like components. The principal difference between the head cover shown in FIGS. 12 through 14 and that shown in FIGS. 9 through 11 resides in the shape of the retainer clip means and the manner in which the clip means is molded into the plastic cover.

As best seen in FIG. 14, the clip of this latest embodiment comprises a generally U-shaped clip 100 having a bight portion 102 and a pair of oppositely disposed, yieldably deformable leg portions 104 which cooperate to define a shaft receiving opening 106. Each leg portion 104 is provided with a stub-leg portion 104a which extends generally inwardly of the cover when the cover is positioned over the head of the club.

As before, the cover 110 of this latest form of the invention comprises an enlarged cover section 112 and a skirt section 114. Skirt section 114 has an elongated open mouth 116 extending between the forward and rear ends of the cover. In the manner previously described, an iron 20 (only partially shown) is received within an enlarged cavity 118 formed within the cover section 112.

In this latest form of the invention, the hosel member of the iron 20 is also covered. To provide this covering, the skirt section 114 includes a hosel protector section 120 which includes a portion of the back side 122 of the cover section 112. The combination of the hosel protector section and the skirt section 114 is once again referred to as the protector section of the cover which is generally designated in the drawings by the numeral 124.

Figure 15:
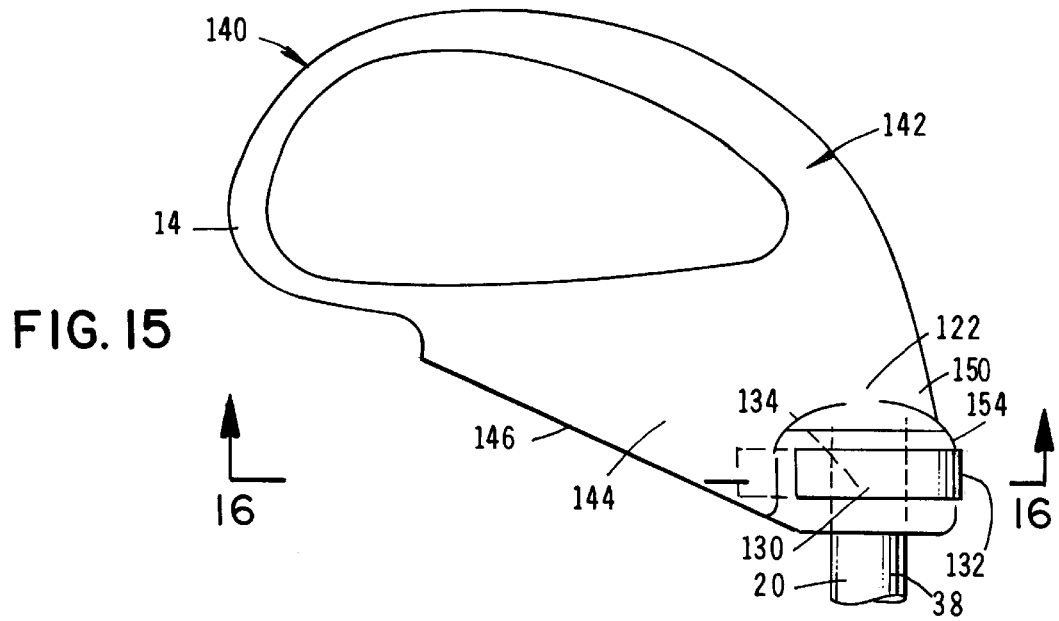
FIG. 15 is a side-elevational view of still another embodiment of the iron cover of the invention.

The previously mentioned means defining the retainer clip 100 functions to prevent the cover from slipping off the head of the iron 20 when the cover is in place over the iron head. While clip 100 is of a slightly different construction from that shown in FIGS. 9 through 11, it is also integrally molded within the moldable plastic resin "R" from which the head cover is formed in accordance with the method of the invention. As best seen in FIG. 15, during molding, the moldable plastic resin encapsulates all of the clip 100 save for the tips of the stub legs 104a and, in this way, holds the clip securely in place within protector section 124.

The method of the latest form of the present invention is substantially identical to that described in connection with the embodiment shown in FIGS. 9 through 11 and, prior to pouring the plastic mixture into the mold, the clip means, or clip 100 is positioned within the mold in the desired location.

Following the filling step, the mold along with the clip 100 are heated in a temperature-controlled oven at an elevated temperature sufficient to cause the moldable plastic mixture to cure and to integrate clip 100 into the cover defining wall. After the mixture has been appropriately cooled, the cover and integrated clip thus formed are removed from the mold.

Figure 16:
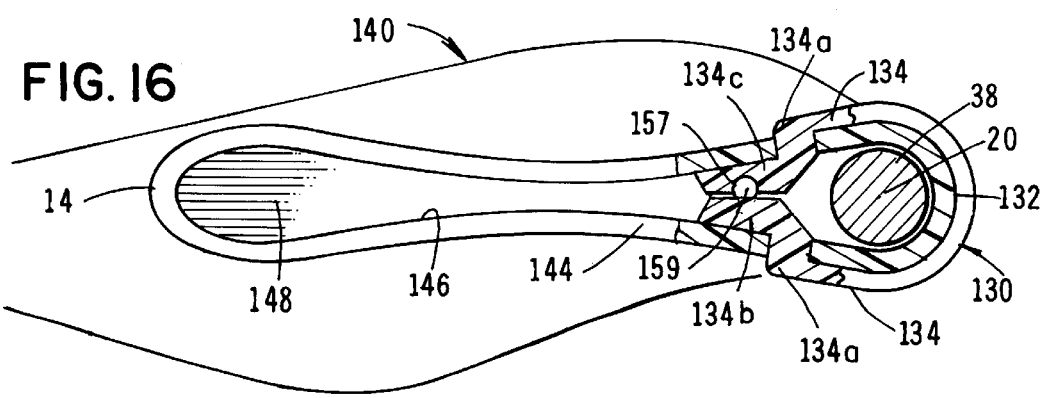
FIG. 16 is a cross-sectional view taken along lines 16—16 of FIG. 15.
Figure 17:
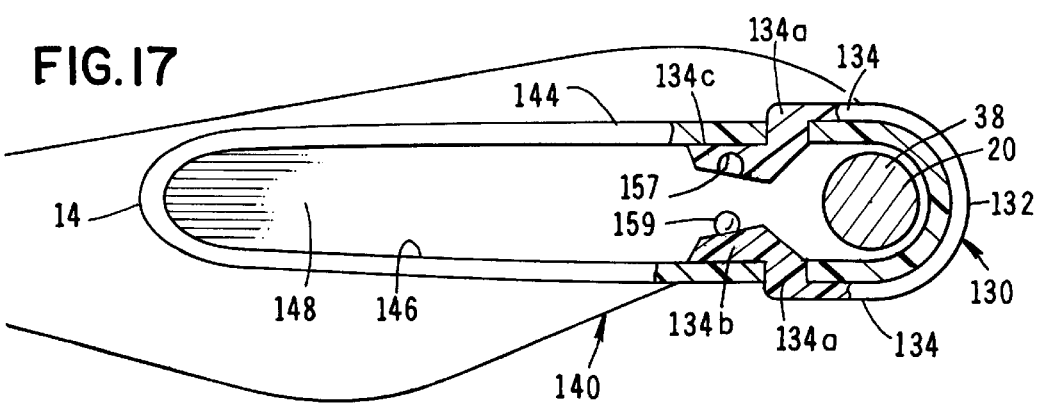
FIG. 17 is a cross-sectional view similar to FIG. 16, but showing the connector elements of the device in an open, spaced apart, non-engaging position.

Turning finally to FIGS. 15 through 17, still another embodiment of the invention is there shown. This embodiment is also similar in some respects to the earlier described embodiment of the invention and like numerals are used in FIGS. 15 through 17 to identify like components. The principal difference between the head cover shown in FIGS. 15 through 17 and that shown in FIGS. 12 through 14 resides in the construction and operation of the retainer clip means of the invention.

As best seen in FIG. 17, the clip of this latest embodiment comprises a generally U-shaped clip 130 having a bight portion 132 and a pair of oppositely disposed, yieldably deformable leg portions 134. Each leg portion 134 is provided with a transverse portion 134a which extends through the side wall of the cover and longitudinally extending portion which is disposed adjacent of the inner surface of the cover. One of the longitudinally extending portions 134b is provided with a male locking element 136 while the other longitudinally extending portion 134c is provided a female locking element. The locking elements 134b and 134c comprise the interengaging means of the invention, the operation of which will presently be described.

As before, the cover 140 of this latest form of the invention comprises an enlarged cover section 142 and a skirt section 144. Skirt section 144 has an elongated open mouth 146 extending between the forward and rear ends of the cover. In the manner previously described, an iron 20 (only partially shown) is received within an enlarged cavity 148 formed within the cover section 142.

In this latest form of the invention, the hosel member of the iron 20 is also covered. To provide this covering, the skirt section 144 includes a hosel protector section 150 which includes a portion of the back side 122 of the cover section 142. The combination of the hosel protector section and the skirt section is once again referred to as the protector section of the cover which is generally designated in the drawings by the numeral 154.

The previously mentioned means defining the retainer clip 130 functions to prevent the cover from slipping off the head of the iron 20 when the cover is in place over the iron head. As best seen in FIGS. 15 and 17, clip 130 is of a substantially different construction from that shown in FIGS. 12 through 14.

More particularly, as previously discussed, clip 130 is generally U-shaped in configuration having a pair of oppositely disposed, yieldably deformable leg portions 134, the transverse portions 134a of which extend through the cover and into the internal cavity of the cover sections. Integrally formed with the transverse portions 134a are longitudinally extending portions 134b and 134c which carry the interengaging means of the invention for lockably interconnecting together the longitudinally extending portions. In the form of the invention shown in the drawings, the interengaging means comprise a socket like portion 157 formed on leg portion 134c and a mating ball-like portion 159 formed on leg portion 134b (FIG. 17). This ball and socket type locking arrangement is of a character well known to those skilled in the art. With this construction, since the opening in socket-like portions 157 is slightly smaller than the diameter of ball-like portion 136 and since the leg portions 134b and 134c are preferably formed of a yieldably deformable plastic material, a joining pressure exerted on the leg portions will cause ball-like portion 159 to snap into locking engagement with socket-like portion 157 in the manner shown in FIG. 16. Accordingly, after the cover has been emplaced over the iron in the manner shown in FIG. 15, a pressure exerted on the side walls of the cover proximate clip 130 will cause clip portions 134b and 134c to move from the open position shown in FIG. 17 to the interengaged, locked position shown in FIG. 15 thereby positively securing the cover to the iron.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A head cover for an iron golf club which has a head connected to a shaft by a hosel member, said head cover including:
   (a) an enlarged cover section formed of a moldable plastic which fits over the head of irons of different sizes, said cover section having an internal cavity, an enlarged open mouth through which the head passes upon placing the cover section over said head, and a protector section which covers, at least partially, the hosel member when the head is received within the cavity; and
   (b) means defining a clip interconnected with said protector section proximate the open mouth thereof, said means defining a clip comprising a generally U-shaped clip having a pair of oppositely disposed, yieldably deformable legs defining a shaft receiving opening, said legs circumscribing the shaft of the iron golf club and expanding apart as the shaft of the iron golf club is pushed into the cavity and retracting to hold the shaft when the head is received within the cavity, at least a portion of said legs extending into said internal cavity of said cover section.

2. The head cover of claim 1 in which each said leg of said clip includes a spaced apart opening for receiving moldable plastic therein for retaining said clip within said protector section.

3. A head cover as defined in claim 1 in which said clip is generally U-shaped in cross section and comprises a bight portion interconnecting said leg portions, and said leg portions including extremity portions extending through said cover and into said internal cavity.

4. A head cover as defined in claim 3 in which said extremity portions include a transversely extending portion extending through said cover and a longitudinally extending portion disposed in close proximity with said cover section.

5. A head cover as defined in claim 4 in which one of said longitudinally extending portions includes a male locking element and the other includes a female locking element for lockably receiving said male locking element.

6. A head cover for an iron golf club which has a head connected to a shaft by a hosel member, said head cover including:
   (a) an enlarged cover section formed of a moldable polyvinyl resin which fits over the head of irons of different sizes, said cover section having an internal cavity, an enlarged open mouth through which the head passes upon placing the cover section over said head, and a protector section which covers, at least partially, the hosel member when the head is received within the cavity; and
   (b) means defining a clip interconnected with said protector section proximate the open mouth thereof, said means defining a clip comprising a generally U-shaped clip having a pair of oppositely disposed, yieldably deformable legs defining a shaft receiving opening, each said leg having an inwardly extending portion extending into said internal cavity, said legs expanding apart as the iron golf club is pushed into the cavity and retracting to hold the shaft when the head is received within the cavity.

7. A head cover as defined in claim 6 in which each said leg of said clip further includes spaced-apart openings for receiving moldable plastic therein for retaining said clip within said protector section.

8. A head cover as defined in claim 6 in which said clip is generally U-shaped in cross section and comprises a bight portion interconnecting said leg portions, and in which said leg portions include interengaging means for releasably interconnecting together said leg portions.

9. A head cover as defined in claim 8 in which said leg portions of said clip each include a transverse portion extending through said cover and a longitudinally extending portion extending longitudinally of said internal cavity.

10. A head cover as defined in claim 9 in which said interengaging means comprises a male locking element formed on one of said longitudinally extending portions and a female locking element formed on the other of said longitudinally extending portions, said female locking element lockably receiving said male locking element.

11. A head cover as defined in claim 10 in which said male locking element comprises a ball-like member and in which said female element comprises a socket configured to closely receive said ball-like member.

\* \* \* \* \*